United States Patent [19]
Wei et al.

[11] Patent Number: 5,808,460
[45] Date of Patent: Sep. 15, 1998

[54] RAPID POWER ENABLING CIRCUIT

[75] Inventors: Sen-Jung Wei, Cupertino, Calif.; Bryan E. Bloodworth, Irving; Davy H. Choi, Garland, both of Tex.

[73] Assignee: Texas Instruments Incorporated, Dallas, Tex.

[21] Appl. No.: 939,538

[22] Filed: Sep. 29, 1997

[51] Int. Cl.$^6$ ....................................................... G05F 3/16
[52] U.S. Cl. ............................................................. 323/315
[58] Field of Search ................................... 323/315, 317, 323/901

[56] References Cited

U.S. PATENT DOCUMENTS

| | | | |
|---|---|---|---|
| 5,204,612 | 4/1993 | Lingstaedt | 323/317 |
| 5,451,861 | 9/1995 | Giebel | 323/315 |
| 5,512,815 | 4/1996 | Schrader | 323/315 |
| 5,557,194 | 9/1996 | Kato | 323/315 |
| 5,629,614 | 5/1997 | Choe et al. | 323/315 |

*Primary Examiner*—Jeffrey L. Sterrett
*Attorney, Agent, or Firm*—Bret J. Petersen; Wade James Brady, III; Richard L. Donaldson

[57] ABSTRACT

An improved power-up circuit utilizing a simple current channel to rapidly charge or discharge nodes during the power-up transient, the time from when the circuit is signaled to power up to the time when the circuit becomes fully functional. The invention allows critical nodes previously limiting the power-up sequence to be rapidly charged to significantly improve the power-up performance of power savings circuits.

8 Claims, 2 Drawing Sheets

RAPID POWER ENABLING CIRCUIT

FIELD OF THE INVENTION

The present invention relates to enhancing the power efficiency of integrated circuit systems. More particularly, it relates to a power enabling circuit for rapidly enabling a circuit after being powered down to decrease the power-on transient period.

BACKGROUND OF THE INVENTION

In order to enhance power consumption efficiency, many large integrated circuit systems power down parts of the circuitry when they are not in use. These circuits are then powered up prior to their operation. Enhanced power consumption efficiency is particularly important in the portable electronics and other battery powered electronics where battery life is critical.

FIG. 1 is a typical circuit's current supply that is always on when the system power is on, according to the prior art. $I_{BIAS}$ may be one of many constant bias currents for the different circuits within the system as provided by the mirror reference block 12 shown in FIG. 2. $I_{OUT}$ is the current supplied to a specific circuit shown as load 20, generated from $I_{BIAS}$. In order to improve system power efficiency, it would be advantageous to eliminate $I_{OUT}$ from specific circuits during the times they are not used.

FIG. 2 shows a simplified block diagram of a typical analog integrated circuit. The analog blocks 10 contain components to perform some particular function. Each of the analog blocks receive a bias current $I_{BIAS}$ from a mirror reference block 12. The mirror reference block provides one or more small bias currents which are a mirror current of an accurate reference current $I_B$ supplied by a band gap source 14. The band gap source may be constructed as is known in the prior art and supplied by a power supply 16. A control block 18 contains the logic or circuitry used to control the timing of the power savings. The control block has a low power control line (LPR) which signals an analog block to shut down to conserve power.

FIG. 3 represents an analog block 10 shown in FIG. 1, a conventional prior art power-saving circuit, consisting of only MNZ2 which is attached to node NP. During the low-power mode (LPR=1), MNZ2 is turned on, pulling node NP to ground and turning off MN1 and MNLOAD. During normal operation, MNZ2 is off and node NP is allowed to settle to its appropriate voltage level. The disadvantage of using MNZ2 as the only power-savings circuit is the long transient time at power-up required to charge node NP and turn on MNLOAD. This transient time is determined by the magnitude of the parasitic load capacitance, $C_{PLOAD}$, and by the total available current ($I_{BIAS}$) to charge the capacitance. Therefore, upon power-up, LPR transitions from 1-to-0, turning MNZ2 off. $I_{BIAS}$ will then start charging node NP, enabling MN1 and MNLOAD. Unfortunately, in order to save power, $I_{BIAS}$ is typically small causing a lengthy power-up time, dramatically limiting the amount of time the analog block 10 may be powered down.

SUMMARY OF THE INVENTION

Many large integrated circuit systems power down parts of the circuitry when they are not in use to enhance power consumption efficiency. In prior art systems, there exists a long transient period from the time the circuit is signaled to power up to the time when the circuit becomes fully functional. The presented solution utilizes a current channel to rapidly charge or discharge nodes during the power-up transient, thereby significantly decreasing this transient period. The nodes selected are usually the critical nodes limiting the power-up sequence.

An embodiment of the present invention provides a rapid power enabling circuit for an analog circuit of an electronic system having a load transistor providing an output current, a current mirror transistor supplied with a low current bias coupled to said load transistor at a mirror node such that said output current is a mirror of said low current bias, a complementary transistor pair connected between said mirror node and a power source, wherein the gates of said transistor pair are driven by a low power control signal which produces a current pulse from the complementary pair to the mirror node during the power up and power down transition of said analog circuit as controlled by said low power control signal.

An advantage of the present invention is a simple current channel to provide a current pulse to quickly charge or discharge nodes limiting the power up sequence during the power-up transient.

Another advantage of the present invention is the present invention can be used in a variety of electronic systems which need quick power-up of electronic circuits driven by a current mirror architecture.

A further advantage of the present invention is the circuit can be applied to varying transistor current mirror technologies.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

Figure 1:
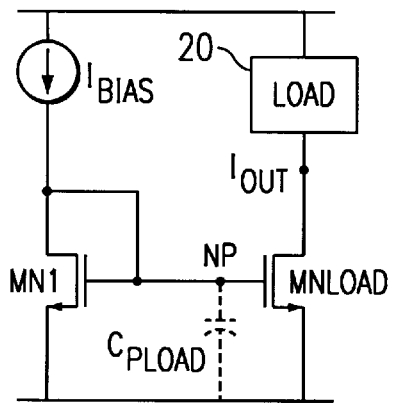
FIG. 1 An analog circuit according to the prior art.
Figure 3:
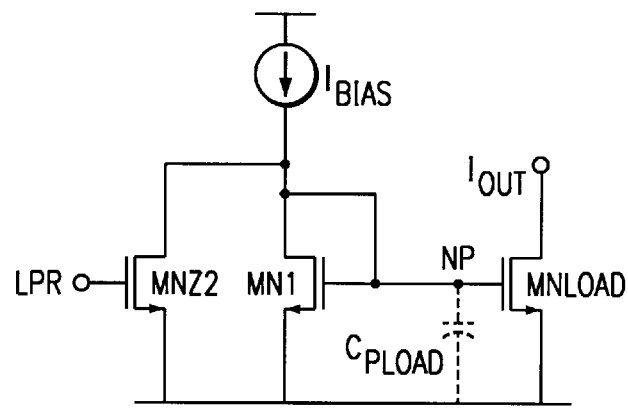
FIG. 3 Represents a prior art rapid enabling circuit.
Figure 2:
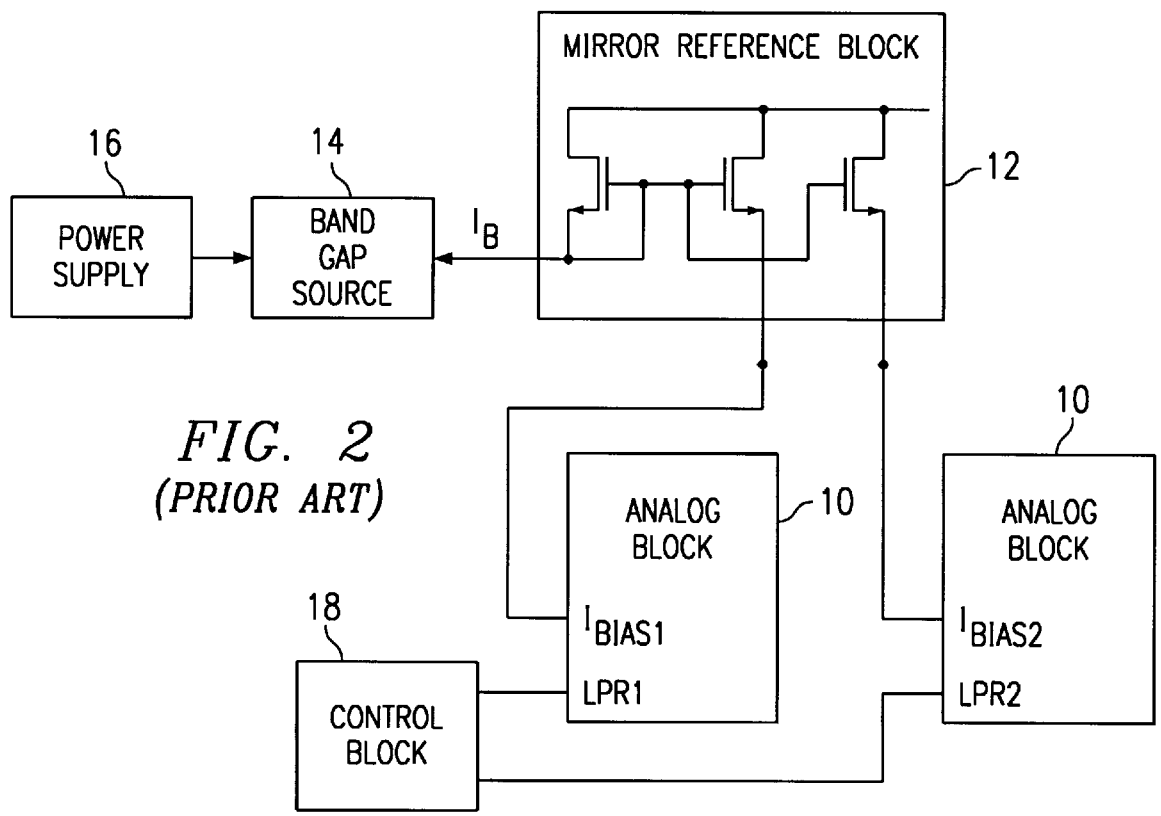
FIG. 2 An analog circuit block diagram according to the prior art.
Figure 4:
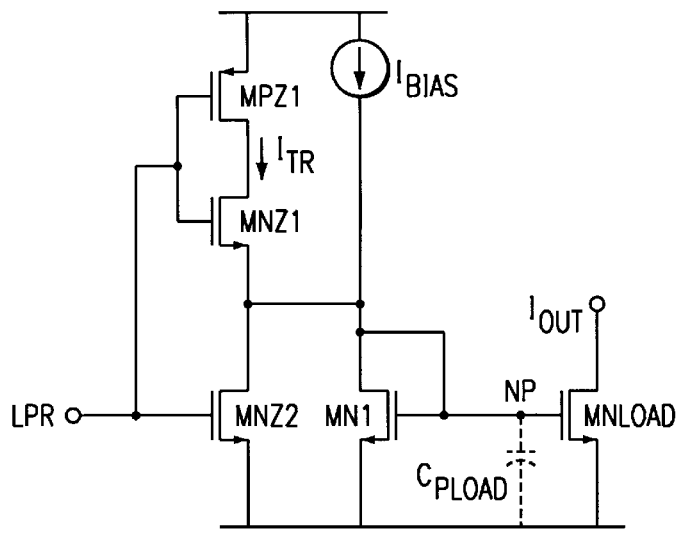
FIG. 4 Represents a rapid enabling circuit according to an embodiment of the present invention.

With reference to FIG. 4 there is shown an embodiment of the present invention. This circuit solves the problem of a long power-up transient for power efficiency circuits which use current mirrors to power analog circuits. The long power-up transient can be dramatically reduced by adding a complementary pair, MNZ1 and MPZ1 between the power supply and the critical node (NP) as shown in FIG. 4. With this addition, an extra current path from the positive power supply to node NP is provided. However, this additional current, $I_{TR}$, is supplied only during the complementary pair's transient switching state and the normal operation of the circuit is not effected.

Figure 5A:
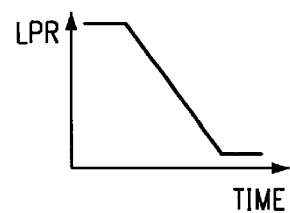
FIGS. 5a and 5b Show the input and output of signals into the embodiment of the present invention represented in FIG. 4.
Figure 5B:
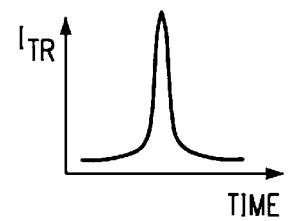

FIG. 5a shows LPR during its transient from 1-to-0. FIG. 5b shows the resulting current pulse supplying the additional change to node NP by the rapid power enabling circuit described in reference to FIG. 4. The magnitude and width of the current pulse can be scaled by varying the areas of MNZ1 and MPZ1.

Conversely, when the circuit is powered down and LPR transitions from 0-to-1, the complementary pair will again provide the current pulse $I_{TR}$. However, since MNZ2 will be turning on during this transition, all the current will be routed to ground quickly discharging node NP.

Figure 6:
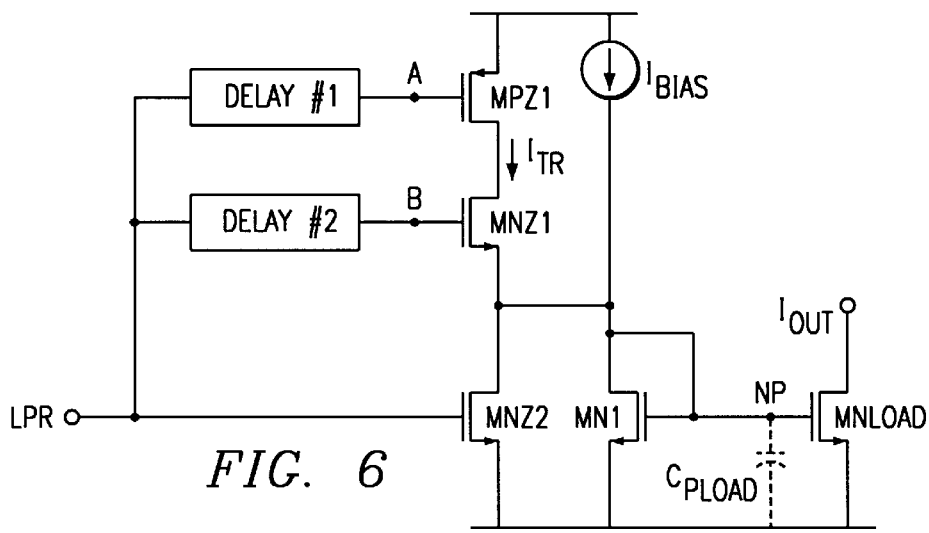
FIG. 6 Represents rapid enabling circuit according to another embodiment of the present invention.

The rapid power enabling circuit may be further enhanced by adding a combination of delay elements in series with LPR and the gates of MNZ1 and MPZ1 as depicted in FIG. 6. These delay elements (Delay #1 and Delay #2) may be scaled to further shape the current pulse $I_{TR}$, specifically widening the pulse and thus providing additional charge to node NP.

Figure 7:
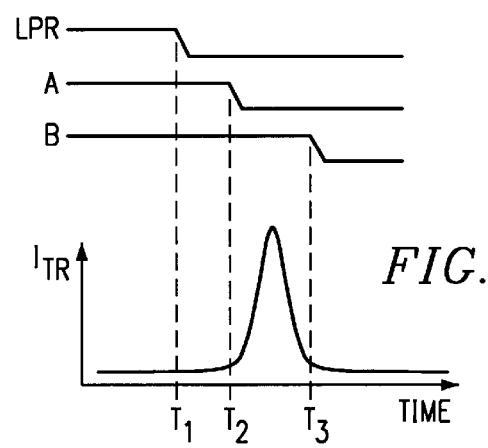
FIG. 7 Shows the input and output of signals into the embodiment of the present invention represented in FIG. 6.

In order to completely understand the circuit consider FIG. 7. In this depiction, LPR transitions from 1-to-0 at time $t_1$, thus turning off MNZ2 and allowing current to charge the load capacitance $C_{PLOAD}$. After a delay length of Delay #1, node A changes state from 1-to-0, turning MPZ on at time $t_2$. Between times $t_2$ and $t_3$, both MPZ1 and MNZ1 are on, allowing current to flow from the positive power supply to NP. After a delay length of Delay #2, MNZ1 turns off, severing the current path at time $t_3$. Therefore, the width of the current pulse and thus power-up time may be changed by varying delays Delay #1 and Delay #2.

Simulated results have indicated over a 5× improvement using the rapid power enabling circuit. For example, one critical circuit that did take 375 nsec to power up, is now able to power up in less than 60 nsec.

What is claimed is:

1. A rapid power enabling circuit for an analog circuit of an electronic system comprising:
   a. a load transistor providing an output current;
   b. a current mirror transistor supplied with a low current bias coupled to said load transistor at a mirror node such that said output current is a mirror of said low current bias;
   c. a complementary transistor pair, having an nmos and a pmos transistor, connected between said mirror node and a power source, wherein the gates of said transistor pair are driven by a low power control signal which produces a current pulse from the complementary pair to the mirror node during the power up and power down transition of said analog circuit as controlled by said low power control signal.

2. The rapid power enabling circuit of claim 1 wherein said current mirror transistor is also controlled by said low power control signal.

3. The rapid power enabling circuit of claim 1 further comprising a delay between each gate of said complementary pair and said low power control signal.

4. The rapid power enabling circuit of claim 3 wherein said nmos transistor of said complementary pair has a greater delay between its gate and the low power control signal compared to the delay at the gate of said pmos transistor.

5. A an integrated circuit having a rapid power enabling circuit for an electronic system comprising:
   a. a load transistor providing an output current;
   b. a current mirror transistor supplied with a low current bias coupled to said load transistor at a mirror node such that said output current is a mirror of said low current bias;
   c. a complementary transistor pair, having an nmos and a pmos transistor, connected between said mirror node and a power source, wherein the gates of said transistor pair are driven by a low power control signal which produces a current pulse from the complementary pair to the mirror node during the power up and power down transition of said analog circuit as controlled by said low power control signal.

6. The integrated circuit of claim 5 wherein said current mirror transistor is also controlled by said low power control signal.

7. The integrated circuit of claim 5 further comprising a delay between each gate of said complementary pair and said low power control signal.

8. The integrated circuit of claim 7 wherein said nmos transistor of said complementary pair has a greater delay between its gate and the low power control signal compared to the delay at the gate of said pmos transistor.

* * * * *